United States Patent [19]

Miyakawa et al.

[11] Patent Number: 4,611,621
[45] Date of Patent: Sep. 16, 1986

[54] PRESSURE CONTROL VALVE AND OIL SUPPLY DEVICE USING SAID VALVE

[75] Inventors: Shinpei Miyakawa; Masaaki Kinbara, both of Tokyo, Japan

[73] Assignee: Ebara Corporation, Japan

[21] Appl. No.: 725,112

[22] Filed: Apr. 19, 1985

Related U.S. Application Data

[63] Continuation-in-part of Ser. No. 537,363, Sep. 15, 1983, abandoned.

[30] Foreign Application Priority Data

Jan. 16, 1982 [JP] Japan .................................. 57-5251
Jan. 16, 1982 [JP] Japan .................................. 57-5252
Jan. 17, 1983 [WO] PCT Int'l Appl. ... PCT/JP83/00014

[51] Int. Cl.⁴ ............................................. F16K 17/00
[52] U.S. Cl. ...................................... 137/115; 137/488
[58] Field of Search ............ 137/115, 116, 488, 596.12, 137/625.66, 625.68; 251/28

[56] References Cited

U.S. PATENT DOCUMENTS

| | | | |
|---|---|---|---|
| 2,316,445 | 4/1943 | Marshall | 137/116 |
| 2,649,107 | 8/1953 | Avery | 137/115 |
| 2,664,908 | 1/1954 | Strnad | 137/116 |
| 2,779,346 | 1/1957 | Curiett | |
| 2,966,891 | 1/1961 | Williams | 137/625.66 X |
| 3,200,830 | 8/1965 | Moyer et al. | 137/115 X |
| 3,270,763 | 9/1966 | Kiefer | 137/116 |
| 4,180,089 | 12/1979 | Webb | 137/115 |
| 4,222,409 | 9/1980 | Budzich | 137/625.68 X |
| 4,262,775 | 4/1981 | Webb | 137/115 X |

FOREIGN PATENT DOCUMENTS

| | | | |
|---|---|---|---|
| 532589 | 8/1931 | Fed. Rep. of Germany | 137/488 |
| 9642 | 5/1966 | Japan . | |
| 13531 | 4/1974 | Japan . | |
| 16631 | 2/1977 | Japan . | |
| 589644 | 6/1947 | United Kingdom | 137/488 |
| 842065 | 7/1960 | United Kingdom | 91/28 |

Primary Examiner—Gerald A. Michalsky
Attorney, Agent, or Firm—Steinberg & Raskin

[57] ABSTRACT

A pressure control valve for maintaining a control pressure constant even if the flow rate of pressurized oil varies, and an oil supply apparatus adapted for a turbo machine using this pressure control valve. The pressure control valve drives a throttle valve by a hydraulic cylinder through the operation of the piston of the cylinder by a guide valve. A port is formed so as to throttle and release the oil at the input side to control the pressure at the inlet side of the valve, oil from the output side for controlling the pressure is guided to the guide valve, and the cylinder communicates with an oil pressure source through the guide valve. An oil supply apparatus which has this pressure control valve guides a pilot tube leading from the header which feeds to the load side of the guide valve, and guides the pressurized oil from the conduit between the pressurized oil supply source to the header and to the throttle valve, thereby releasing the pressurized oil to an oil tank. In this manner, the offset in the pressure control circuit becomes zero, with an extremely good response, thereby avoiding the problem of tripping of the turbo machine, and providing explosion-preventive properties only with hydraulic control.

11 Claims, 2 Drawing Figures

PRESSURE CONTROL VALVE AND OIL SUPPLY DEVICE USING SAID VALVE

BACKGROUND OF THE INVENTION

This is a continuation-in-part of co-pending application Ser. No. 537,363, filed Sept. 15, 1983, now abandoned.

This invention relates to a pressure control valve and more particularly, to a pressure control valve having a valve structure which keeps a control pressure constant even when the flow rate of the pressurized oil passing therethrough changes. The present invention also relates to an oil supply apparatus using the pressure control valve and more particularly, to an oil supply apparatus for use in turbo machinery such as turbines, compressors, etc.

Direct operated relief valves, balance relief valves, and balance valves using a spool spring have been known in the past to be used as pressure control valves.

However, none of these valves are suitable for applications where response accuracy is required because an offset (which is referred to as the "over-ride characteristics of the relief valve" and which exceeds 10% of the rated pressure) remains.

Although electromagnetic proportional valves have been available in recent years for remote valve operations, they are not free from the problems of hysteresis, low reproducibility and the increased cost which results from the joint use of amplifiers. Moreover, the valves must be provided with an explosion-preventive property when used in petroleum refineries, etc.

Conventional oil supply apparatus used in turbo machinery employ air operated process control valves as back pressure control valves and seal differential pressure control valves for explosion-preventive purposes, or in accordance with the customary practice to conform with the API standards. Namely, to control a header pressure to a constant level, it has been customary to connect the header to an air operated type of process control valve via a pressure generator, an adjuster, etc., to detect the header pressure by the pressure generator, to send a signal to the adjuster so as to compare its value with a set pressure, and to open or close the air operated process control valve in accordance with the difference and thus adjust the quantity of pressurized oil relieved.

However, the response of this air-pressure controlled system is much slower than the response of the hydraulic system, or that of the mechanical system during the automatic change-over or parallel operation of a plurality of oil hydraulic supply pumps, although the offset in this air pressure controlled system using PID control is zero. For this reason, the system cannot sufficiently control the header pressure, and abnormalities such as the excessive rise or drop of the header pressure occur. These pressure fluctuations in turn result in the problem that tripping could occur in the turbine or compressor. The use of the air operated process control valve also results in a remarkable rise in the production cost because it must be used in combination with a pressure transmitter, an adjuster, a process control valve, etc. A more serious problem would occur when commercially available relief valves which have gained a wide application in the past are used, because an extremely large offset remains and they cannot be used for the pressure control system of an oil supply apparatus unless some specific countermeasure is taken.

SUMMARY OF THE INVENTION

The present invention is therefore directed to providing a pressure control valve in which control pressure does not change even if the flow rate varies, which has no offset, and which can effect pressure control at a high level of accuracy, by improving on the undesirable characteristics of those valve structures which are conventionally used for the pressure control of hydraulic circuits, which simply balance the force acting upon the pressure-receiving area of the valve body of the control valve with a spring force, typically exemplified by direct operated relief valves and balance relief valves in which the control pressure increases if the flow rate of the liquid passing through the valves increases.

It is another object of the present invention to provide an oil supply apparatus which eliminates the above problems with the oil supply apparatus for turbo machinery, and which can keep the header pressure constant without any response delay, irrespective of pressure fluctuations that result from changes in the quantity of oil supplied by an oil supply device.

To accomplish these objects, the present invention provides a pressure control valve which comprises a guide valve including a first spool whose movement is restricted by the pressure of a spring and a pilot pressure opposing each other, a cylinder incorporating therein a slidable piston into which pressurized oil flows in accordance with the movement of the first spool of the guide valve, and a throttle valve including a second spool whose movement is controlled by the piston sliding inside the cylinder.

The present invention also provides an oil supply apparatus using the pressure control valve described above. The oil supply apparatus of the invention comprises a plurality of oil hydraulic pumps, a single main piping arrangement gathering together the discharge pipes of the oil hydraulic pumps, a header supplying pressurized oil to other devices connected to the oil hydraulic pumps via the main piping arrangement, a pressure control valve directly connecting a conduit supplying pilot pressurized oil from the header to a branch pipe branching from the main piping arrangement, and a hydraulic source supplying the pressurized oil to the pressure control valve, wherein the pressure control valve is equipped with a guide valve including a first spool whose movement is restricted by the pressure of a spring and a pilot pressure opposing each other, a cylinder incorporating therein a slidable piston into which the pressurized oil from the hydraulic source flows in accordance with the movement of the first spool of the guide valve, and a throttle valve including a second spool whose movement is controlled by the piston sliding inside the cylinder, and the branch pipe is connected to the throttle valve.

Preferred embodiments of the pressure control valve in accordance with the present invention are described in further detail below.

BRIEF DESCRIPTION OF THE DRAWINGS

Other objects, features and effects of the present invention will become more apparent from the following description thereof in conjunction with the accompanying drawings, in which.

DETAILED DESCRIPTION OF THE PREFERRED EMBODIMENTS

Figure 1:
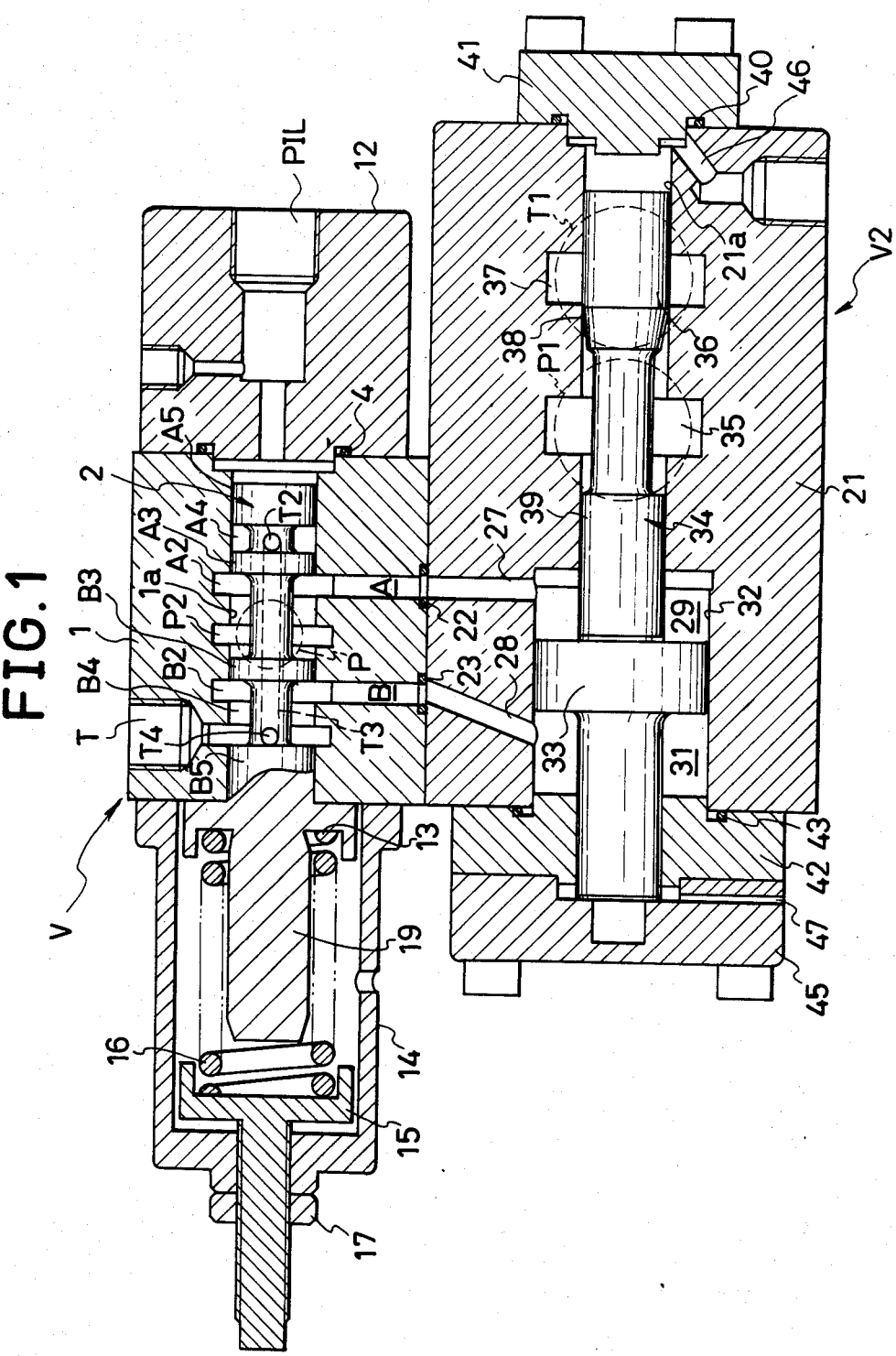
FIG. 1 is a longitudinal sectional view illustrating a pressure control valve in accordance with the present invention.

Referring to FIG. 1, a port P to which external pressurized oil is supplied is provided in a valve body 1 of a guide valve V having an integral barrel so that a pipe can be connected to the port P. The port P communicates with a port P2 which is defined as a circumferential groove around the circumference of a barrel bore 1a. Ports A2 and B2 that are similarly defined as circumferential grooves are disposed on both sides of the port P2 so as to communicate with ports A and B, respectively.

A spool 2 is slidably inserted into the barrel bore 1a of the valve body 1 and is equipped with lands A3 and B3 whose positions, when the valve is in the neutral state, conform with those of the ports A2 and B2 defined as circumferential grooves, and whose widths are the same as those of the ports A2 and B2. Lands A5 and B5 are disposed outwardly from these lands A3 and B3, with relief grooves A4 and B4 of the spool 2 being respectively interposed therebetween. According to this arrangement, when the spool 2 moves to the right in FIG. 1, ports T and B, formed in the valve body 1 as illustrated in the drawing, communicate with each other via the relief groove B4. When the spool 2 moves to the left, on the other hand, port A communicates with port T in the valve body 1 via the relief groove A4, an oil passage T2 in the radial direction of the spool 2, an oil passage T3 which extends in the axial direction along the center of the spool 2 and whose two ends are closed, and an oil passage T4 that opens in the radial direction into the relief groove B4 of the spool 2.

A coupling 12, connecting piping which introduces the pilot pressurized oil, is attached to the valve body 1 via a sealing ring 4, and a pilot port PIL is formed in the coupling 12. The pilot pressurized oil flows into this pilot port PIL.

A spring seat 13 is integrally formed at the other end of the spool 2 and a cover 14 is fixed to the valve body 1 so as to cover this spring seat 13. A spring seat 15 is screwed inside the cover 14 at a position in which it faces the spring seat 13. A compression coil spring 16 is interposed between these two spring seats 13 and 15. When the spring seat 15 is rotated, the compression coil spring 16 moves back and forth and its compressive force on the spool 2 can be changed. A lock nut 17 is screwed onto a male thread around the central axis of the spring seat 15, locking the spring seat 15 to the cover 14. Reference numeral 19 in the drawing represents a guide member which has a round cross-section and prevents any abnormal deformation of the compression coil spring 16. This guide member 19 is formed on the end surface of the spring seat 13 so as to be integral with the end surface and to project therefrom.

A valve body 21 of a throttle valve V2 having an integral barrel is also fixed to the valve body 1 of the guide valve V, and the ports A and B in the valve body 1 of the guide valve V are tightly sealed by sealing rings 22, 23, respectively, to the valve body 21 of the throttle valve. Ports A and B disposed in the valve body 1 of the guide valve V are connected to cylinder chambers 29 and 31 respectively of a hydraulic cylinder 32 formed integrally with the valve body 21 via oil passage 27, 28, respectively, in the valve body 21 of the throttle valve V2.

The hydraulic cylinder 32 is divided into the cylinder chambers 29 and 31 by a piston 33 slidably incorporated in the cylinder. The piston 33 is formed integrally with a spool 34 of the throttle valve V2. As the pressurized oil introduced from a port P1 in the valve body 21 enters a circumferential groove 35 around a barrel bore 21a, a land 36 of this spool 34 covers or opens a lap section 38 of a port 37 formed as a circumferential groove in the barrel bore 21a of the main valve body 21, thereby throttling the pressurized oil and feeding the pressurized oil, via external piping, to the nonpressurized region from the port T1 which communicates with the port 37 and is formed in the valve body 21. Since a rod section 39 of the piston 33 is tightly fitted into the barrel bore 21a, it restricts the flow of the oil between the cylinder chamber 29 and the throttle valve side of the lap section 38.

A cap 41 is fitted and fixed to the end of the barrel bore 21a of the valve body 21 via a sealing ring 40. At the other end, a cylinder cap 42 is fitted and fixed to the cylinder 32 via a sealing ring 43, and a cap 45 is fitted and fixed to the cylinder cap 42. A drain port 47 is formed in the cap 45 so that oil leaking between the spool 34 and the cylinder cap 42 escapes from the space between the cap 45 and the spool 34. A port 46 may be provided in the valve body 21 as illustrated.

The pressure control valve in accordance with the present invention operates in the following manner. The port P of the guide valve V is connected to a hydraulic source (not shown), this hydraulic source being irrelevant to the hydraulic circuit being controlled. The port T of the guide valve V is connected so as to return oil to the hydraulic source connected to the port P. The pilot port PIL of the coupling 12 of the guide valve V is connected to the hydraulic output from which a predetermined pressure is to be obtained. The port P1 of the throttle valve V2 is connected to piping feeding the pressurized oil towards the header on the hydraulic output side from which a predetermined pressure is to be obtained. The port T1 is connected to a part which is connected to the oil tank of this pressurized oil supply source.

When constant pressure control is effected in which the pressure is controlled to a predetermined pressure, the spool 2 is at its neutral position in which the pressure applied from the pilot port PIL to the spool 2 balances the pressure of the compression coil spring 16, and consequently the lands A3, B3 conform with the ports A2, B2, and the lap section 38 of the throttle valve V2 throttles the pressurized oil from the port P1 communicating with the pressurized oil supply piping and releases it from the port T1.

If the header pressure on the output side increases due to a fluctuation in the supplied oil pressure or to a change in the load, the pilot pressure rises so that the pressurized oil flows from the pilot port PIL and moves the spool 2 to the left in the drawing against the force of the compression coil spring 16. As a result, the pressurized oil from the port P passes from the side of the circumferential groove P2 through the opening between land B3 and port B2, enters port B2, flows through port B, then enters the cylinder chamber 31 from the oil passage 28 and urges the piston 33 to the right. Accordingly, the oil in the cylinder chamber 29 enters port A from the oil passage 27, passes through the opening between land A3 and port A2 from the port A2, flows into the relief groove A4, passes through the oil passages T2, T3, T4 and reaches port T.

Accordingly, the spool 34 moves to the right and the opening of the lap section 38 becomes larger so that the quantity of oil overflowing from the port P1 to the port T1 increases. As a result, the pressure on the feed side communicating with port P1 drops so that the header pressure on the output side drops and the pilot pressure also drops. The spool 2 is urged by the compression coil spring 16 to move to the right. In this case, when the pilot pressure reaches the predetermined pressure, the spool 2 balances with the compression coil spring 16 at its neutral position and the piston 33 is kept at a predetermined position.

When the header pressure on the output side drops, however, the compression coil spring 16 moves the spool 2 to the right from the neutral position due to the drop in the pilot pressure. In this case, the pressurized oil from port P enters the circumferential groove P2, flow through port A from the opening between land A3 and port A2, flows into the cylinder chamber 29 through the oil passage 27 and urges the piston 33 to the left. The oil in the cylinder chamber 31 is returned from port T to the hydraulic source via the oil passage 28, port B, the opening between port B2 and land B3 and the relief groove B4.

When the spool 34 moves to the left, the opening of the lap section 38 becomes smaller and the quantity of oil flowing from port P1 to port T1 decreases so that the oil pressure on the feed side rises and, together therewith, the pilot pressure rises. Hence, the spool 2 returns to its neutral position and the piston 33 is kept at another predetermined position.

Since a servo mechanism using the guide valve is employed, these operations do not, in any way, leave any offset that occurs in pressure control valves which simply balance a valve of the conventional type against the force of a spring. Pressure control having a high response accuracy can be made.

Figure 2:
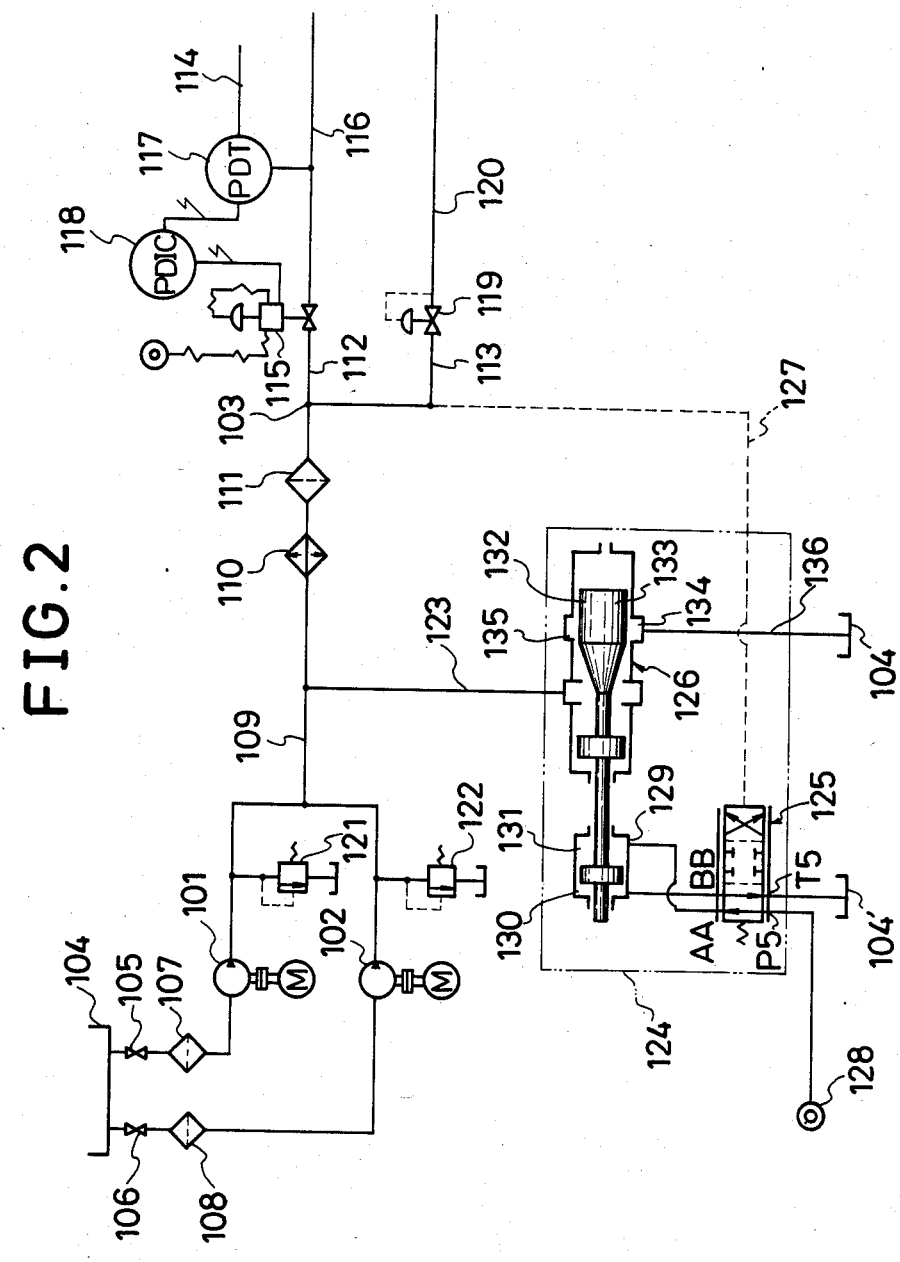
FIG. 2 is a schematic illustration of the oil pressure piping arrangement of an oil supply apparatus in accordance with the present invention.

An example of a hydraulic circuit of an oil supply apparatus using the pressure control valve in accordance with the present invention, is illustrated in FIG. 2.

In FIG. 2, the oil that flows from the oil tank 104 passes through check valves 105, 106 and is filtered by filters 107, 108, sucked by main and auxiliary oil hydraulic pumps 101, 102, respectively, and the discharged oil is gathered in a piping arrangement 109 and is then sent to a header 103 through an oil cooler 110 and an oil filter 111. The oil in the header 103 branches into piping 112 supplying oil as the sealing oil of a turbo compressor, for example, and piping 113 supplying oil as lubricant. The piping 112 is connected to a feed pipe 116 for the sealing oil so as to send the oil to the seal parts of the turbo machinery via a control valve 115.

A differential pressure generator 117 detects the pressure difference between the pressure of the gas used as the operating medium that is led from the discharge side of the turbo compressor to piping 114 and the pressure of the pressurized oil led from the feed pipe 116 for sealing oil. The generator generates and sends a signal corresponding to the pressure difference between the pressure of the sealing oil and the operating gas pressure to an adjuster 118, which compares this signal with a set value, controls the flow rate by means of the control valve 115, and supplies the sealing oil while maintaining the pressure difference between the sealing oil in the feed pipe 116 and the gas pressure used as the operating medium.

The lubricant is supplied by a feed pipe 120 from the piping 113 via a control valve 119 and is sent to the part of the turbo machinery needing lubrication such as the bearings. The flow rate is controlled by the control valve 119 so that the supply pressure is constant. The occurrence of an abnormally high discharge pressure which exceeds the control range of the main oil hydraulic pump 101, is controlled by a relief valve 121, while any abnormally high discharge pressure exceeding the control range of the auxiliary oil hydraulic pump 102, is controlled by another relief valve 122.

Piping 123 for oil relief branches from the piping 109, and the quantity of relieved oil is controlled through a throttle valve 126 of a hydraulic pilot operated back-pressure control valve 124 (which represents the pressure control valve of the present invention and whose detailed explanation has been provided above). The escape oil is thus made to overflow into the oil tank 104.

The hydraulic pilot operated back-pressure control valve 124 includes a guide valve 125 and the throttle valve 126 which is a spool valve operated by a hydraulic cylinder. It leads the pressurized oil from the header 103 through a pilot pipe 127 so as to urge the spool of the guide valve 125 against a spring. The pressurized oil is supplied from a hydraulic source 128 to a port P5 of the guide valve 125, and a port T5 is connected to an oil tank 104'. The guide valve 125 changes over between ports AA and BB and supplies pressurized oil to a hydraulic cylinder 129. It controls the pressurized oil supplied to cylinder chambers 130, 131, and operates the throttle valve 126 by the movement of the piston rod in the hydraulic cylinder 129 which is integral with the spool 132 of the throttle valve 126. The throttle valve 126 throttles the oil which is relieved from the piping 123 through a lap section 135 and a drain pipe 136 to the oil tank 104 by the opening (both positive and negative) of the lap section 135 between a land 133 on the spool 132 and a circumferential groove port 134 of the barrel.

The pressure in the header 103 section needs to be high enough so as to be controllable up to the highest pressure of the feed pipe 116 for the sealing oil. This pressure is set sufficiently higher than the pressure of the feed pipe 120 for the lubricant so as to enable the control of the lubricant supply pressure to a predetermined level.

When only the main oil hydraulic pump 101 is operating, the guide valve 125 is operated by the pressurized oil supplied through the pilot pipe 127 so that the pressure of the header 103 reaches a predetermined pressure, and the pressures of the pressurized oil in the cylinder chambers 130 and 131 of the oil pressure cylinder 129 balance each other to keep the spool 132 at a predetermined position, and hence the spool of the guide valve 125 is at the neutral position. The pressurized oil is made to overflow into the drain pipe through the lap section 135 between the land 133 of the throttle valve 126 and the port 134 of the barrel from the side toward the piping 123 so as to maintain the header pressure.

If the pressure of the header 103 drops due to an increase in the load, the auxiliary oil hydraulic pump 102 is actuated (the control method is omitted from this explanation) and both the main and auxiliary oil hydraulic pumps 101 and 102 operate in parallel. The output oils are combined, pass through the oil cooler 110 and the oil filter 111, and flow from the header 103 to the load side. If the flow rate is greater than the quantity of oil necessary for the load, the header pressure attempts to increase. However, the pressure applied to the guide valve 125 through the pilot pipe 127 moves the spool of the guide valve 125, which is at the neutral position, to the left due to a slight increase of the header pressure, so that the pressurized oil is supplied from port BB to the cylinder chamber 130 of the oil pressure cylinder 129 to move the spool 132 to the right. Accordingly, the opening of the throttle valve 126 increases and the oil relieved from the drain pipe 136 through the piping 123 increases and acts so as to reduce the pressure of the header 103.

When the pressure of the header 103 reaches a predetermined value, the opening of the throttle valve 126 follows and balances it so that the header pressure becomes a control pressure, and the pressure applied to the guide valve 125 also becomes a predetermined control pressure. Hence, the spool of the guide valve 125 moves to the right toward the neutral position and stays at the neutral position. When the oil quantity on the load side drops, the header pressure attempts to increase and the hydraulic pilot operated backpressure control valve 124 performs the same operation as described above.

If the operation of the auxiliary oil hydraulic pump 102 is stopped in accordance with the quantity of oil on the load side from the main and auxiliary oil pumps 101 and 102 that are being operated in parallel, the quantity of oil supplied drops dramatically and the header pressure drops since a large quantity of relieving oil is made to flow from the piping 123 to the drain pipe 136 through the throttle valve 126. Accordingly, since the oil pressure inside the pilot pipe 127 also drops, the spool of the guide valve 125 is moved to the right by the force of the spring against the pressurized oil that is being supplied from the pilot pipe 127, and the pressurized oil comes out from port P5 of the guide valve 125 to port AA, then enters the cylinder chamber 131 and moves the spool 132 to the left. As a result, the opening of the lap section 138 of the throttle valve 126 becomes smaller and this reduces the throttle so that the quantity of oil supplied by the header 103 increases and the header pressure rises. When the header pressure reaches a predetermined pressure, the force of the spring in the guide valve 125 and the thrust of the pilot pressure balance each other, and the guide valve 125 remains at the neutral position.

Next, if the main oil hydraulic pump 101 is being operated but is automatically changed over to the auxiliary oil hydraulic pump 102 for maintenance, for example, the pressure in the piping 109 varies widely during the change-over, and this makes the header pressure fluctuate. As previously described, when the header pressure rises above the predetermined pressure, the spool of the guide valve 125 receives the header pressure from the pilot pipe 127 and the pressurized oil flows from port P5, to port BB, to the cylinder chamber 130, and thus moves the spool 132 to the right and increases the opening of the throttle valve. On the other hand, when the header pressure drops below the predetermined pressure, the spring force pushing the spool of the guide valve 125 overcomes the pressure from the pilot pipe 127 and the spool of the guide valve 125 moves to the right and the pressurized oil flows from port P5, to port AA to the cylinder chamber 131. In this manner, the pressurized oil moves the spool 132 to the left and reduces the opening of the throttle valve 126, thereby servo-controlling the oil pressure of the header 103 to the predetermined pressure.

As is clear from the above description, the pressure control valve in accordance with the present invention has an arrangement in which the piston of a hydraulic cylinder is actuated by a guide valve, a throttle valve is actuated by the hydraulic cylinder, a port for throttling and relieving the oil on the input side of the pressure control is provided on the inflow side of the throttle valve, the oil on the output side of the pressure control is supplied to the guide valve, and the hydraulic cylinder and the hydraulic source are connected to each other by the guide valve. According to this arrangement, the offset in the pressure control circuit is zero, the response is far better than in an air pressure control system, and since only control of the oil pressure is effected, the system of the invention is explosion resistant.

In the oil supply device for turbo machinery or the like of the present invention, a pilot pipe leading from a header section, through which oil is made to flow to the load side, is connected to a guide valve in a hydraulic pilot operated back-pressure control valve including the guide valve and a throttle valve of the hydraulic cylinder operated type which is actuated by the guide valve, and the pressured oil is supplied to the throttle valve from the piping from a hydraulic supply source to the header, and is relieved to an oil tank. In comparison with a conventional air pressure controlled system, the oil supply device of this invention has a faster response, and hence can prevent any problems such as tripping of the turbine, compressor or the like due to extreme fluctuations of the pressure of the supplied sealing oil and lubricant. Moreover, since only the pilot pipe leads from the header to the guide valve, the device is economical and completely eliminates any offset resulting from over-riding that occurs when a relief valve is used. Since air and electrical systems are not provided on the oil feed side and only the oil pressure control is controlled, maintenance can be done easily. This also contributes to the explosion-preventive properties thereof.

Though the embodiment deals with the case in which main and auxiliary oil hydraulic pumps are used, the effect of the present invention can be obtained in the same way when the discharge pipes of a plurality of oil hydraulic pumps are joined together and led to the header.

The preceding description of the present invention is merely exemplary, and is not intended to limit the scope thereof in any way.

What is claimed is:

1. A pressure control valve, comprising:
   a guide valve including a first spool whose movement is restricted by the pressure of a spring and a pilot pressure opposing each other;
   a cylinder incorporating therein a slidable piston into which an operating fluid flows in response to the movement of said first spool of said guide valve; and
   a throttle valve including a second spool whose movement is controlled by said piston slidably disposed inside said cylinder;
   said guide valve including a valve body equipped with a barrel bore and said first spool slidably disposed inside said barrel bore, a pressurized oil inlet port into which pressurized oil from a hydraulic source flows, a port for relieving the pressurized oil, a pilot port into which a pilot pressure oil is applied, and a pair of change-over ports which are changed over by the movement of said first spool and are disposed in said valve body so as to communicate with said barrel bore;

urging means for urging said first spool unidirectionally, being operatively connected to one end of said first spool with the other end of said spool being opposite to said pilot port;

said first spool being provided with control means for controlling the passage of the pressurized oil from said hydraulic source;

said throttle valve including a valve body equipped with a barrel bore, said second spool slidably disposed inside said barrel bore, a pressurized oil inlet port into which pressurized oil to be controlled flows, and a port for relieving the pressurized oil, being disposed on said valve body of said throttle valve so as to communicate with said barrel bore of said throttle valve;

said second spool being connected to said piston and provided with means for throttling the flow rate of the pressurized oil to be controlled;

said cylinder being separated by said piston into a first cylinder chamber and a second cylinder chamber;

said first cylinder chamber communicating with one of said pair of change-over ports via an oil passage, and said second cylinder chamber communicating with the other change-over port of said change-over ports via an oil passage;

said pressurized oil inlet port and said pressurized oil relief port communicating with said barrel bore via respective ports defined as circumferential grooves around the inner circumference of said barrel bore;

said means for throttling the flow rate of the pressurized oil to be controlled including a land provided on said second spool and lapping over said one of said ports defined as circumferential grooves which communicates with said relief port for the pressurized oil; and said second spool situated to be movable only by the pressurized oil introduced into the cylinder chambers on both sides of said piston.

2. The pressure control valve as defined in claim 1, wherein said pressurized oil inlet port and said pair of change-over ports communicate with said barrel bore via ports, each being formed as circumferential grooves around the inner circumferential surface of said barrel bore.

3. The pressure control valve as defined in claim 2, wherein said control means for controlling the passage of the pressurized oil from said hydraulic source, disposed on said first spool, includes a pair of first lands arranged at positions corresponding to said pair of ports defined as the circumferential grooves which are provided so as to correspond with said pair of change-over ports, said lands having the same width as said respective groove ports, a pair of relief grooves provided outwardly of said pair of first lands, a pair of second lands provided outwardly from said pair of relief grooves, a first port disposed in the radial direction in said first spool, a port disposed at the axis of said first spool in the axial direction, and having one end thereof communicating with said first port, and a second port disposed in the radial direction in said first spool and communicating with the other end of said axial port.

4. The pressure control valve as defined in claim 1, wherein said urging means for urging said first spool unidirectionally includes a spring seat provided on the end surface of said first spool and provided with a guide member projecting therefrom, a cover fixed to said valve body of said guide valve so as to cover said spring seat, a spring seat screwed onto said cover at the position facing said spring seat disposed on the end surface of said first spool, and a compression coil spring interposed between said two spring seats so as to surround said guide member.

5. The pressure control valve as defined in claim 1, wherein said pilot port is disposed in a coupling fixed to said valve body of said guide valve via a sealing ring.

6. The valve of claim 1, wherein said land is tapered inwardly in a direction from said relief port circumferential groove to said inlet port circumferential groove.

7. The valve of claim 1, wherein said throttle valve is disposed to be operable only by pressurized oil flow into or out of said first or second cylinder chambers.

8. The valve of claim 1, additionally comprising a second separate hydraulic source communicating with said pressurized oil inlet port in said throttle valve.

9. An oil supply apparatus, comprising:

a plurality of oil hydraulic pumps, a single main piping arrangement gathering discharge pipes of said plurality of oil hydraulic pumps, a header for supplying pressurized oil to other apparatus, said header connected to said oil hydraulic pumps via said main piping arrangement, a pressure control valve directly connecting a conduit for leading pilot pressurized oil from said header to a branch pipe branching from said main piping arrangement, and a hydraulic source for supplying the pressurized oil to said pressure control valve, wherein said pressure control valve includes a guide valve having a first spool whose movement is restricted by the presence of a spring and said pilot pressure opposing each other, a cylinder incorporating therein a slidable piston into which the pressurized oil from said hydraulic source flows in response to the movement of said first spool of said guide valve, and a throttle valve having a second spool whose movement is controlled by said piston slidably disposed inside said cylinder, said guide valve including a valve body equipped with a barrel bore and said first spool slidably disposed inside said barrel bore, a pressurized oil inlet port into which pressurized oil from the hydraulic source flows, a port for relieving the pressurized oil, a pilot port into which the pilot pressure oil is applied, and a pair of change-over ports which are changed over by the movement of said first spool and are disposed in said valve body so as to communicate with said barrel bore, urging means for urging said first spool unidirectionally, being operatively connected to one end of said first spool with the other end of said spool being opposite to said pilot port, said first spool being provided with control means for controlling the passage of the pressurized oil from said hydraulic source, said throttle valve including a valve body equipped with a barrel bore, said second spool slidably disposed inside said barrel bore, a pressurized oil inlet port into which pressurized oil to be controlled flows, and a port for relieving the pressurized oil being disposed on said valve body of said throttle valve so as to communicate with said barrel bore of said throttle valve, said second spool being connected to said piston and provided with means for throttling the flow rate of the pressurized oil to be controlled, said cylinder being separated by said piston into a first cylinder chamber and a second cylinder chamber, said first cylinder chamber communicating with one of said pair of change-over ports via an oil passage, and said second cylinder chamber communicating with the other change-over port of said change-over ports via an oil passage, said pressurized oil inlet port and said pressurized oil relief port communicating with said barrel bore via respective ports defined as circumferential grooves around the inner circumference of said barrel bore, said means for throttling the flow rate of the pressurized oil to be controlled including a land provided on said second spool and lapping over said one of said ports defined as circumferential grooves which communicates with said relief port for the pressurized oil, said second spool situated to be movable only by the pressurized oil introduced into the cylinder chambers on both sides of said piston, and wherein said branch pipe is connected to said throttle valve.

10. The apparatus of claim 9, wherein said hydraulic source for supplying the pressurized oil to said pressure control valve communicates with said pressure control valve separately from said branch pipe.

11. The apparatus of claim 9, wherein said branch pipe is connected with said pressurized oil inlet port of said throttle valve.

* * * * *